May 4, 1954     C. W. SUGGS     2,677,554
HITCH MECHANISM FOR PICKUP LOADING DEVICES
Filed Feb. 26, 1952     2 Sheets-Sheet 1
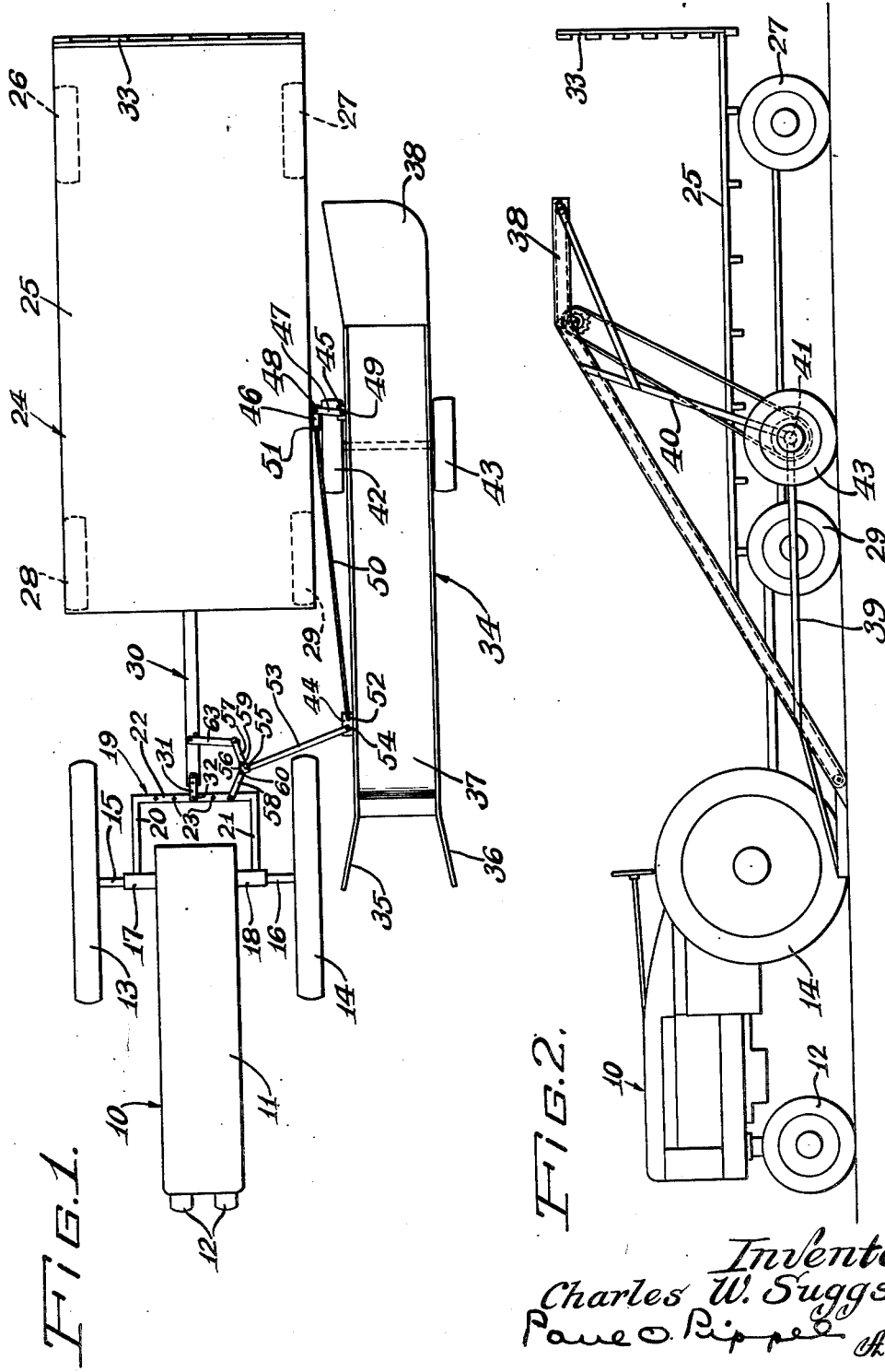
Inventor:
Charles W. Suggs
Paul O. Rippel
Atty.

Inventor:
Charles W. Suggs
Paul O. Pippel
Atty.

Patented May 4, 1954

2,677,554

UNITED STATES PATENT OFFICE 2,677,554

HITCH MECHANISM FOR PICKUP LOADING DEVICES

Charles W. Suggs, Raleigh, N. C., assignor to International Harvester Company, a corporation of New Jersey Application February 26, 1952, Serial No. 273,398

7 Claims. (Cl. 280—411)

This invention relates to a new and improved hitch mechanism for pickup loading devices.

Loading devices such as bale loaders are used for the purpose of traversing a field in which bales have been made and dropped on the ground and picking up these bales. As a general rule the bales so made and dropped are arranged in rows. However, these rows are not always straight but rather are quite irregular as the bales dropping from the balers will fall off first to one side and then to the other. Bale loaders are employed to pick up the relatively heavy bales and elevate them for deposit onto a truck or wagon to effect transport of the bales from the field in which they are made. In order to pick up the bales from the irregular rows in which the bales lie it is essential that the bale loader be freely maneuverable by the operator thereof to pick up all of the hay bales. Such bale loaders were initially designed to be mounted on and carried by self-propelled trucks. The loaders were thus fixedly mounted with respect to the trucks and an operator driving such a truck could easily steer the combined truck and loader to pick up the irregularly spaced and positioned bales. Many farmers do not have trucks available but do have farm tractors and wagons and hence have resorted to using their available equipment with these bale loaders. A tractor pulled wagon is capable of functioning as a loading medium in the same manner as a self-propelled truck but the hitch joint between the tractor and trailing wagon causes that combination of vehicles to turn differently and be less maneuverable than trucks of the same or similar loading capacities. Further, when affixing a bale loader to the side of a tractor trailing wagon it has been found to be almost impossible to pick up irregularly positioned bales without the tractor wheels passing over the bale, thus causing that bale to be destroyed before it is picked up.

A principal object of this invention is therefore to provide a hitch means for a bale loader on a tractor trailing wagon.

An important object of this invention is in the provision of hitch means for a bale loader mounted on the side of a tractor and trailing wagon and arranged and constructed to amplify the swinging of the bale loader when the tractor is turned in one direction.

Another and further important object of this invention is to supply a hitch means for a bale loader which will permit the mounting on a tractor and trailing wagon and provide for easy maneuvering to pick up irregularly spaced and positioned hay bales without the necessity of running over such bales.

Still another object of this invention is to provide hitch mechanism for a loading device such as a bale loader to a tractor pulled wagon in which a portion of the hitch is fastened to the tractor drawbar, another portion attached to the wagon tongue and a third portion attached to the side of the wagon.

A further important object of this invention is the provision of hitch means for a side mounted bale loader in which the loader is swung outwardly an amplified amount when turning the pulling tractor in one direction and has a minimum swinging movement with respect to the tractor when the tractor is turned in the other direction.

Other and further important objects and advantages of this invention will become apparent from the disclosures in the following specification and accompanying drawings.

In the drawings:

Figure 1 is a top plan view of the bale loader as mounted on and with a tractor and trailing wagon.

Figure 2 is a side elevational view of the device as shown in Figure 1.

Figure 3:
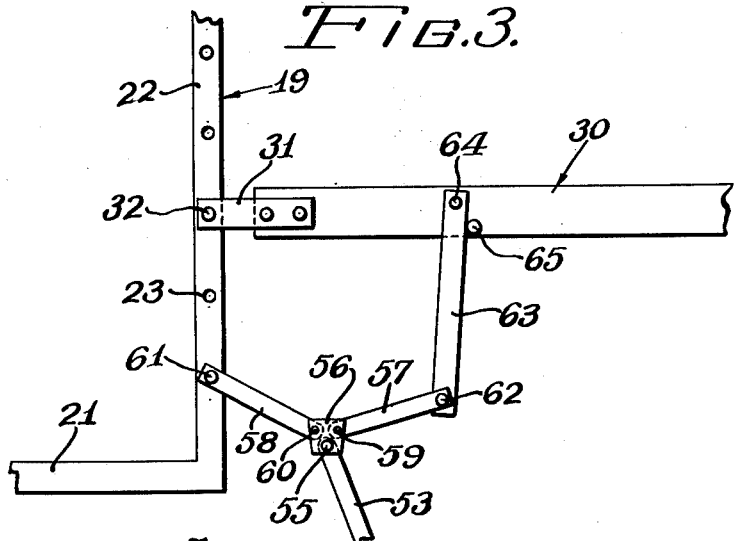
Figure 3 is an enlarged top plan view detail of a portion of the hitch as shown in Figure 1.

As shown in the drawings, the reference numeral 10 indicates generally an agricultural type tractor having a relatively longitudinally extending chassis and engine 11, steerable wheels 12 carrying the forward end, and relatively widely spaced large traction wheels 13 and 14 supporting the rear end thereof. The wheels 13 and 14 are carried on axles 15 and 16 which are respectively journaled within transversely extending axle housings 17 and 18. A tractor drawbar 19 is fastened to and carried by the axle housings 17 and 18 and provides means for pulling many types of farm implements and wagons or the like. The drawbar 19 includes longitudinally and rearwardly extending side members 20 and 21 and a transversely extending end member 22 joining the side members 20 and 21. The end bar 22 is equipped with a plurality of spaced holes 23 through which a clevis pin or the like may pass. The plurality of spaced holes 23 permits the draft of a vehicle at various lateral positions with respect to the tractor.

In the device as shown in Figure 1 the tractor is shown as pulling a farm type wagon 24. The wagon includes a bed or floor portion 25 carried by spaced wheels 26 and 27 at the rear thereof and 28 and 29 at the forward portion. The front wheels 28 and 29 form a part of a steering truck which includes the wagon tongue 30. The tongue 30 projects forwardly and terminates in a clevis 31. The wagon tongue is fastened to the tractor drawbar 19 by means of a vertically disposed pin 32 passing through the clevis 31 and as shown in Figure 1 the central opening 23 in the rear bar 22 of the tractor drawbar 19. A wagon of the type as shown at 24 is capable of supporting many hay bales as the bed portion 25 comprises a large unobstructed area. The rearward end of the bed 25 is provided with a vertically disposed end wall 33 against which the hay bales are originally stacked, the end wall of course will prevent sliding or tumbling of the bales off the rear of the wagon.

The tractor 10 and trailing wagon 24 have mounted thereon a bale loader 34 which as shown in Figures 1 and 2 is equipped with a forwardly extending pickup having laterally spaced and diverging arms 35 and 36 which are arranged and constructed in the operation of the loader to guide hay bales into the scope of an elevating conveyor 37 which is adapted to carry the bales upwardly and rearwardly to a discharging platform 38. The device of this invention provides for two operators, one who drives the tractor and one who stands on the wagon bed to arrange and stack the bales.

The bale loader 34 is equipped with supporting frame arms 39 and 40 which support the inclined conveyor 37. The juncture of the frame arms 39 and 40 at 41 constitutes the center axis of a wheel supporting truck having spaced wheels 42 and 43. The bale loader 34 is provided with a laterally extending side bracket 44 at a position adjacent the forward end and a second laterally extending side bracket 45 spaced rearwardly from the bracket 44 and lying closely adjacent the side of the wagon bed 25. The brackets 44 and 45 are thus longitudinally spaced apart. The trailing wagon 24 has a fixed bracket 46 projecting outwardly from one side thereof at a position opposite the rearmost bracket 45 on the bale loader 34. A connecting link 47 is pivotally mounted at 48 on the stationary wagon 46 and is pivotally mounted at its other end at 49 on the bale loader bracket 45. It is thus apparent that the rearward portion of bale loader 34 is relatively fixed in its spaced apart position from the trailing wagon 24 and yet is provided a degree of limited hinging movement with respect thereto. A second tie rod or link 50 is hingedly mounted at its rearmost end at 51 on the wagon bracket 46. The forward end of the link 50 is hingedly mounted at 52 to the front bracket 44 on the bale loader 34.

A hitch link 53 is hingedly mounted at its outer end at 54 to the bale loader side bracket 44. The inner end of the link 53 is hinged at 55 to a toggle plate member 56. The plate 56 is further supported and carried by opposing toggle links 57 and 58. These links are respectively pivotally mounted at 59 and 60 on the plate 56. These details of construction are best shown in the enlarged detail plan view of Figure 3. The forward end of the first toggle link 58 is hingedly mounted at 61 in one of the laterally disposed holes 23 of the tractor drawbar 19. The rearward end of the opposing second toggle link 57 is hingedly mounted at 62 to an arm 63 having limited horizontal hinging movement about the hinge pin 64 on the wagon tongue 30. The link 63 is permitted forward swinging about the hinge 64 but is restricted against rearward swinging by reason of a stationary post 65 fixedly positioned on the wagon tongue 30 spaced laterally from the hinge pin 64.

Figure 4:
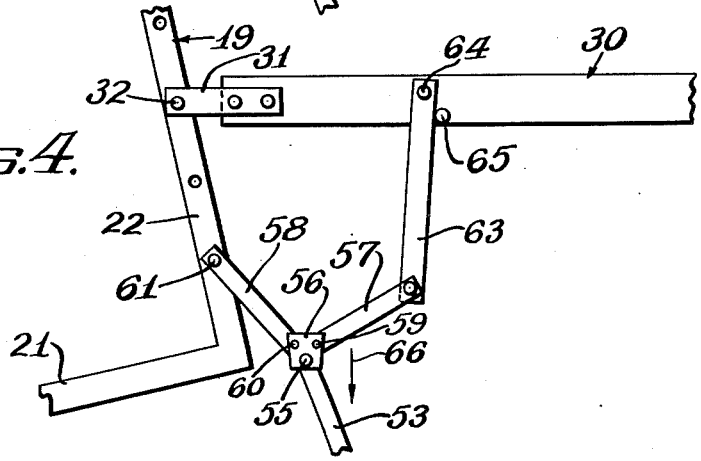
Figure 4 is a view similar to Figure 3 with the tractor in a turned position.

As previously stated the bale loader 34 is hingedly mounted at its rear with respect to the side of the trailing wagon 24 by reason of the link 47 and the further link 50. The linkage mechanism just described for Figure 3 provides for the attachment of the forward portion of the bale loader to the tractor and the trailing wagon, and thus as the tractor is propelled it pulls with it the trailing wagon 24 as well as the side positioned bale loader 34. The turning of a tractor by reason of the angling of the steerable wheels 12 immediately causes an opposite angling of the drawbar 19 and thus without suitable counteracting means it would be necessary to turn the tractor 10 through an excessive angular position in order to attempt to pick up an out of line bale before a side mounted bale loader would commence moving in that same direction. In the past this has resulted in the damaging of the bales by running the tractor thereover prior to the time when the bale loader gathering arms 35 and 36 could be positioned for receiving the bale. However, that is no longer true with the device of the present invention. This is illustrated by the hitch device as shown in the detail of Figure 4 wherein the tractor is turned in a direction toward the loader causing the drawbar 19, and particularly its rearmost bar 22, to be angled in a direction to cause a rearward and inward swinging of the hinge point 61 for the toggle link 58. In the event the link 53 were directly attached to the drawbar 19 at 61 the angling of the tractor in the direction indicated would cause the bale loader to be swung inwardly in an exactly opposite direction. This, of course, is not true in the present device inasmuch as the toggle link 58 is disposed intermediate the attachment of the link 53 to the drawbar and by reason thereof the angular closing of the toggle links 57 and 58 actually cause an outward extension of the toggle plate 56 which carries the link 53. This outward extension is indicated by the arrow 66. The angular closing of the toggle links 57 and 58 is insured by the stationary character of the arm 63 as it abuts the post 65. It will thus be evident that as the tractor is turned in the direction of the bale loader as shown in Figure 4 the bale loader will also be moved outwardly in the same direction by reason of the action of the toggle links. This outward movement of the bale loader is in fact amplified by reason of the linkage so that a minimum turning of the tractor will permit the centering of the bale loader to receive an out of line bale relatively easily without any danger whatever of running the tractor over the bale.

Figure 5:
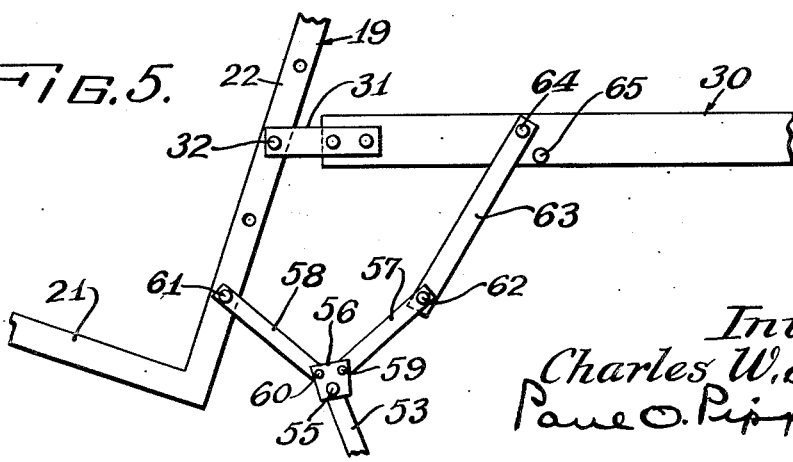
Figure 5 is another view similar to Figure 4 with the tractor turned in the other direction.

When the tractor is turned in the opposite direction away from the bale loader 34 the relative positioning of the hitch link members is shown in Figure 5. In this position the arm 63 is permitted an angular forward swinging to thus counteract the angular closing of the toggle links 57 and 58 and thus permit the bale loader to directly follow the movement of the tractor for easy pickup of out of line bales.

In the operation of the device of this invention the plurality of vehicles is propelled through a field having previously made bales scattered thereover. The operator of the tractor directs the side positioned bale loader 34 into the bales and with the aid of the hitch linkage it is possible to amplify the swinging movement of the bale loader 34 in one direction and to counteract the amplification characteristic when the tractor is turned in the other direction so that the bale loader may be readily positioned in front of bales to be picked up with a minimum of turning of the tractor.

Numerous details of construction may be varied throughout a wide range without departing from the principles disclosed herein and I, therefore, do not propose limiting the patent granted hereon otherwise than as necessitated by the appended claims.

What is claimed is:

1. A hitch mechanism for the attachment of a longitudinally extending pick-up loader to a tractor and trailing wagon in which the wagon has a tongue hinged for horizontal swinging movement to the tractor, comprising a hinge attachment for the rear of said loader to the side of said wagon, link mechanism joining the forward end of said loader to said tractor and said wagon tongue, and said link mechanism having means for increasing the lateral spacing of said loader from said tractor and trailing wagon at the forward end thereof when the tractor is turned in the direction of the loader, said means for increasing the lateral spacing including a toggle linkage between the tractor and wagon tongue, and a connecting link joining the forward end of the loader with said toggle linkage.

2. A device as set forth in claim 1 in which means is interposed between the toggle linkage and the wagon tongue for rendering ineffective the action of the toggle linkage.

3. A hitch mechanism for the attachment of a bale loader to a tractor and trailing wagon wherein the tractor has a transversely disposed drawbar and the wagon has a forwardly projecting tongue hinged to the tractor drawbar, comprising hinged link means joining a rearwardly disposed portion of said loader and the side of said trailing wagon, a link hingedly carried by a forwardly disposed portion of said loader and extending generally transversely toward the side of said tractor and trailing wagon, a first toggle link hinged to said tractor drawbar spaced from said hinged attachment of the wagon tongue in the direction of the bale loader, a toggle plate, said first toggle link hinged at its other end to said toggle plate, said link having its end opposite attachment to the forwardly disposed portion of said loader hinged to said toggle plate, a second toggle link hinged to said toggle plate and substantially opposing said first toggle link, an arm joined to said wagon tongue and extending generally transversely outwardly toward said bale loader, and said second toggle link hinged to the outer end of said arm.

4. A device as set forth in claim 3 in which said arm is hinged to said wagon tongue for horizontal swinging movement, and post means on said wagon tongue eliminating hinging movement of said arm in a rearward direction, whereby when the tractor is turned in a direction toward the bale loader the arm is rigid and the first and second toggle links are angularly closed causing a lateral outward extension of the link joined to the forward portion of said bale loader and when the tractor is turned in the other direction the said arm hinges to nullify the action of the first and second toggle links.

5. A hitch mechanism for the attachment of a bale loader to a tractor and trailing wagon wherein the tractor has a transversely disposed drawbar and the wagon has a forwardly projecting tongue hinged to the tractor drawbar, comprising longitudinally spaced brackets on one side of said bale loader, hinged link means joining the rearwardly disposed bracket and the side of said trailing wagon, a link hingedly carried by the forwardly disposed bracket and extending generally transversely toward the side of said tractor and trailing wagon, a first toggle link hinged to said tractor drawbar spaced from said hinged attachment of the wagon tongue in the direction of the bale loader, a toggle plate, said first toggle link hinged at its other end to said toggle plate, said link having its end opposite attachment to the forwardly disposed bracket hinged to said toggle plate, a second toggle link hinged to said toggle plate and substantially opposing said first toggle link, an arm joined to said wagon tongue and extending generally transversely outwardly toward said bale loader, and said second toggle link hinged to the outer end of said arm.

6. A device as set forth in claim 5 in which a connecting link is hingedly joined between said forwardly disposed loader bracket and the side of the trailing wagon closely adjacent the attachment of said hinged link.

7. A device as set forth in claim 5 in which said arm is arranged and constructed to swing through a horizontal plane, and post means on said wagon tongue spaced laterally outwardly of the hinge attachment of said arm and rearwardly thereof whereby rearward swinging of said arm is prohibited.

References Cited in the file of this patent

UNITED STATES PATENTS

| Number | Name | Date |
|---|---|---|
| 2,255,281 | Dort | Sept. 9, 1941 |
| 2,442,267 | Eksergian | May 25, 1948 |